June 11, 1963 S. CORNBERG 3,092,876

MOVABLE LIVE AUDIENCE AUDITORIUM

Filed June 15, 1960 2 Sheets-Sheet 1

INVENTOR.
SOL CORNBERG

BY Arthur H. Seidel

ATTORNEY

June 11, 1963 S. CORNBERG 3,092,876

MOVABLE LIVE AUDIENCE AUDITORIUM

Filed June 15, 1960 2 Sheets-Sheet 2

*INVENTOR.*
SOL CORNBERG

*BY* Arthur H. Seidel
ATTORNEY 3,092,876
MOVABLE LIVE AUDIENCE AUDITORIUM

Sol Cornberg, 240 Central Park S., New York 19, N.Y.

Filed June 15, 1960, Ser. No. 36,427
7 Claims. (Cl. 20—1.12)

This invention relates to a movable live audience auditorium. More particularly, this invention relates to a prefabricated auditorium which can be assembled and disassembled in a minimum amount of time.

The conventional television studio is a maze of electronic gear, lights, etc. A studio auditorium is provided for the spectators which usually comprises a plurality of stepped platforms mounted on a rigid skeleton with fold-away chairs positioned on the stepped platform. A drape or curtain is provided extending around the periphery of the platform. A live audience is generally desirable since it acts as a sounding board for the actors. However, the architectural environment, as pointed out above, detracts from the receptive mood of the entertainers as well as the audience. The production of a television show requires substantially the same equipment as the production of a Broadway play. However, a Broadway play may last for years, whereas a television show may last for one hour. The same amount of equipment must be moved into and out of a studio as is moved into and out of a theater. Since the time element is involved in the production of a television show, the television studio must have fluidity. By fluidity, is meant that the equipment and the live audience auditorium must be capable of being moved into and out of the area in the studio in which the television show is being televised with rapidity.

The conventional live audience auditorium, as pointed out above, is a make-shift auditorium which lacks the aesthetic qualities needed to place the performers and the audience in a receptive mood. Since space is at a premium in television studios, a means must be provided to store the equipment and the live audience auditorium without requiring trucking or storage space external to the studio. Also, the studio floor and the rigging should not be impaired so as to interfere with the normal use of the studio. It is imperative that the design of a live audience auditorium comply with the fire and building code regulations.

It is an object of the present invention to provide a versatile, flexible, plush, movable live audience studio for the television industry.

It is another object of the present invention to provide a movable live audience auditorium capable of being installed and removed in a minimum of time.

It is another object of the present invention to provide a movable live audience auditorium capable of being stored without requiring trucking or storage space external to the studio.

It is another object of the present invention to provide a movable live audience auditorium which can be installed without impairing the normal use of the studio floor.

It is another object of the present invention to provide a movable live audience auditorium which provides the aesthetic qualities necessary to place the performers and the audience in a receptive mood.

It is another object of the present invention to provide a movable live audience auditorium capable of being suspended from a studio ceiling when not in use.

It is another object of the present invention to provide a movable live audience auditorium with platforms having collapsible leg means thereon.

It is another object of the present invention to provide a movable live audience auditorium having chair means fixedly secured to the removable platforms.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings in detail, wherein like numerals indicate like elements, there is shown in FIGURE 1 a movable live audience auditorium designated generally as 10.

The movable live audience auditorium 10 comprises a plurality of stepped platforms 12, 14, and 16. It will be appreciated that any number of step platforms may be provided. For purposes of illustration, only three stepped platforms have been illustrated.

Figures 1, 2, 3:
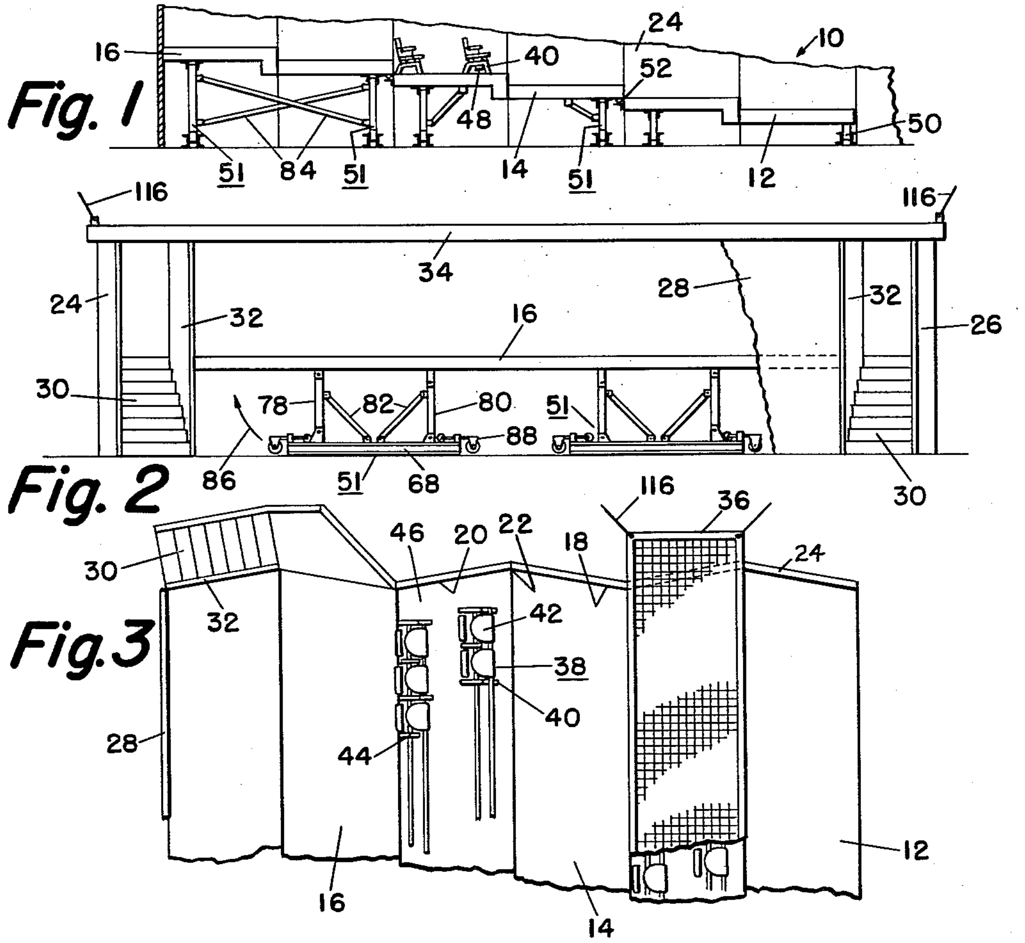
FIGURE 1 is a side elevational view of the platforms of the present invention.
FIGURE 2 is a rear elevational view of the rearmost platform of the present invention, with stairways disposed on either side of the rearmost pltaform, with walls adjacent the side edges of the rearmost platform and a ceiling supported on said walls.
FIGURE 3 is a partial top plan view of a ceiling panel and the platforms of the present invention.

Referring to FIGURE 3, it will be seen that the stepped platforms 12, 14, and 16 are provided with edges 18 and 20 which converge outwardly to an apex 22. The line separating the steps of the stepped platforms 12, 14, and 16 coincides with the apex 22. A pair of side fold-away walls 24 and 26 are provided along the side edges of the stepped platforms 12, 14, and 16. The side walls 24 and 26, as shown more clearly in FIGURE 3, conform to the contour of the platforms 12, 14, and 16.

The fold-away walls 24 and 26 are made of plastic skin material which allows backlighting of various kinds and a modern appearance.

The zig-zag arrangement of the side walls 24 and 26 permits the side walls 24 and 26 to support a much heavier ceiling. In order to provide for free circulation of air and reduce the weight of the ceiling 34 while retaining an aesthetic appearance, the ceiling 34 is preferably made grid-like from aluminum material. In order to facilitate the assembly and disassembly of the movable live audience auditorium 10, the ceiling 34 comprises a plurality of interengaging panels 36. Only one panel 36 is shown in FIGURE 3. However, it will be appreciated that a plurality of panels 36 interengage with one another to form a ceiling 34. As shown more clearly in FIGURE 3, the panels 36 extend outwardly to either side of side walls 24 and 26.

Each of the stepped platforms 12, 14 and 16 are provided with chair means fixedly secured thereto. The chair means 38 preferably comprises a plurality of horizontally disposed horses 40 extending substantially the full width of the panels 12, 14, and 16. For purposes of illustration, the chair means 38 is shown in FIGURES 1 and 3 on the stepped platform 14. The horses 40 are preferably made from lightweight material and are fixedly secured to the platforms 12, 14, and 16. A seat and back unit 42 is fixedly secured to the horses 40 at spaced points therealong. Arm rests 44 are fixedly secured to the horses 40 between adjacent seat and back units 42. As shown more clearly in FIGURE 3, the horses 40 are spaced from the side edges of the platforms 12, 14, and 16 so as to define an aisle 46. The aisle 46 will be covered with a carpet when the live audience auditorium 10 is assembled for use. Since the chair means 38 are fixedly secured to the stepped platforms 12, 14, and 16, the chair means 38 are movable therewith. Thus, the necessity for assembling fold-away chairs and the resultant time required to fold and unfold the chairs has been eliminated.

The chair means 38 are preferably provided with loudspeakers 48 beneath the seat and back units 42.

The stepped platform 12 is provided with selectively removable leg means 50. The stepped platforms 14 and 16 are provided with collapsible leg means 51.

Figure 4:
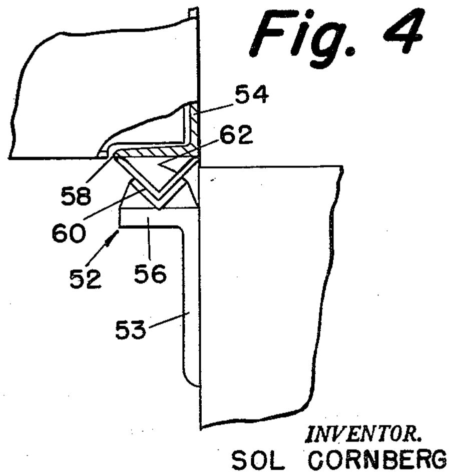
FIGURE 4 is a partial sectional view of the interlocking arrangement of the platforms of the present invention.

The stepped platforms 12, 14, and 16 are maintained in their assembled disposition by a locking means 52. The locking means 52 is shown more clearly in FIGURE 4. An L-shaped bracket 53 is fixedly secured to the rear edge of one of the platforms, for example stepped platform 12. An L-shaped bracket 54 is fixedly secured to the front edge of the adjacent platform, namely stepped platform 14. The short arm 56 on the L-shaped bracket 53 is spaced from and juxtaposed to the short arm 58 on the L-shaped bracket 54. A V-shaped notch 60 is provided on the uppermost surface of the short arm 56. A V-shaped member 62 is provided on the lowermost surface of the short arm 58. The V-shaped member 62 cooperates with the V-shaped notch 60 to lock the stepped platforms 12 and 14 in their assembled disposition.

It will be appreciated that a similar locking means is provided between the adjacent edges of each of the stepped platforms.

Figure 5:
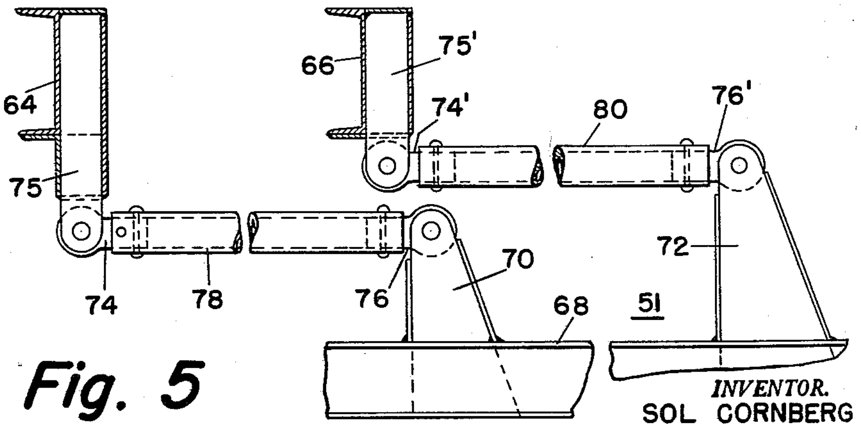
FIGURE 5 is a partial elevational view of the collapsible leg means of the present invention.

Referring to FIGURE 5, it will be seen that the leg means 51 on the stepped platforms 14 and 16 are collapsible. The leg means 51 includes a pair of brackets 64 and 66 adapted to be fixedly secured to the undersurface of the platforms 14 and 16. It will be noted that the bracket 64 is longer than the bracket 66. A floor engaging member 68 is provided beneath the stepped platforms 14 and 16.

A pair of brackets 70 and 72 extend upwardly from the floor engaging member 68 toward the stepped platforms 14 and 16. It will be noted that bracket 72 is longer than bracket 70. An arm 74 is pivotably secured to a post 75 on the bracket 64. An arm 76 is pivotably secured to the bracket 70. A tubular strut 78 is fixedly secured to the pivotable arms 74 and 76. As shown in FIGURE 5, the arms 74 and 76 extend into the tubular strut 78 and are fixedly secured thereto by a bolt.

An arm 74' is pivotably secured to a post 75' on the bracket 66. An arm 76' is pivotably secured to the bracket 72. A tubular strut 80 is fixedly secured at its ends to the pivotable arms 74' and 76'.

As shown more clearly in FIGURE 2, a removable brace 82 extends downwardly from each of the struts 78 and 80 to the floor engaging member 68. As seen more clearly in FIGURE 1, braces 84 extend between the struts on each of the leg means disposed beneath the stepped platform 16. When the braces 82 and 84 have been removed, the leg means 51 are pivoted as shown by the arrow 86 in FIGURE 2. Since FIGURE 5 is a view looking from the front of the stepped platform 16 toward the rear thereof, the floor engaging member 68 is shown in FIGURE 5 as pivoting toward the right in the figure. In the collapsed position of the leg means 51, a suitable bracket extending between the stepped platform 16 and the floor engaging member 68 maintains the leg means 51 in its collapsed position.

Figure 6:
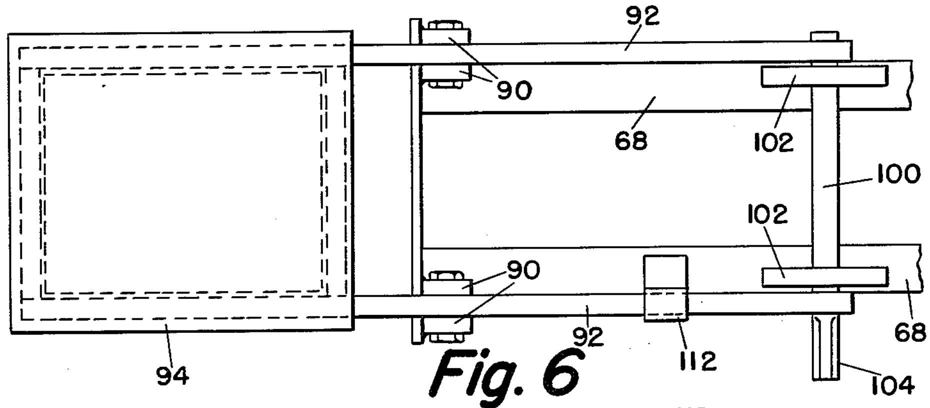
FIGURE 6 is an enlarged top plan view of a detail of the collapsible leg means of the present invention.
Figure 7:
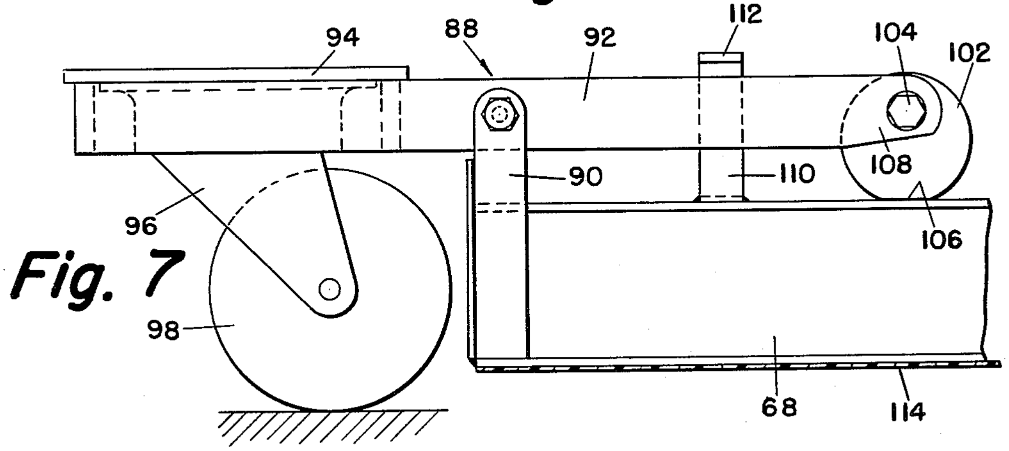
FIGURE 7 is a side elevational enlarged view of the detail shown in FIGURE 6.

Referring to FIGURE 6 and 7, it will be seen that each of the leg means 51 are provided with wheel means 88 selectively operable so that the stepped platforms may be easily moved about during the assembly and disassembly of the live audience auditorium 10. When the platforms, for example stepped platform 16, are in their assembled disposition, the wheel means 88 is selectively rendered inoperative. The inoperative position of the wheel means 88 is shown more clearly in FIGURE 2. The operative position of the wheel means 88 is shown more clearly in FIGURE 7.

The floor engaging member 68 is provided on opposite sides with a pair of spaced ears 90. Each of the ears 90 extend upwardly above the uppermost surface of the floor engaging member 68 and pivotably secure a lever arm 92 intermediate its ends. The ends of the lever arms 92 are connected together on one side of the ears 90 by a caster back-up plate 94. A caster 96 having a rotatable wheel 98 depends from the caster back-up plate 94.

The other ends of the lever arms 92 are provided with holes extending therethrough. A shaft 100 is rotatably mounted in the holes at the other ends of the lever arms 92. A pair of cam members 102 are fixedly secured to the shaft 100 at spaced points intermediate the ends of the shaft 100. As seen more clearly in FIGURE 6, the cam members 102 are disposed intermediate the lever arms 92. One end of the shaft 100, as at 104, is provided with a hexagon contour so that the end 104 may be engaged with a tool for rotating the shaft 100 about its longitudinal axis.

As shown more clearly in FIGURE 7, the cam members 102 are eccentrically mounted on the shaft 100. The cam members 102 are provided with a flat surface which engages the floor engaging member 68 when the wheel means 88 is operatively disposed. The ends of the lever arms 92 adjacent the shaft 100 are beveled as shown at 108 so as to prevent interference between the lever arms 92 and the floor engaging member 68 when their wheel means 88 is in its inoperative position. A bracket 110 extends upwardly from the uppermost surface of the floor engaging member 68 and has an arm 112 which extends over one of the lever arms 92 so as to act as a limit stop. In order to prevent damage to the studio floor, the floor engaging member 68 is provided with a vinyl coating 114 along its lowermost surface.

The movable live audience auditorium 10 of the present invention is disassembled in the following manner:

The panels 36 of the ceiling 34 are individually raised into an upright position substantially perpendicular to the floor of the studio by cables 116 secured along one edge of each panel. When the ceiling 34 has been removed, and suspended from the ceiling of the studio, cables are secured to the side walls 24 and 26 and the rear wall 28. The walls 24, 26, and 28 are vertically raised and suspended from the studio ceiling. The stairs 30 are provided with casters or other wheel means and are then physically moved into a storage position. The stepped platforms 12, 14, and 16 are disassembled beginning with the foremost platform, namely stepped platform 12. As the platforms, for example stepped platform 14, are collapsed, said stepped platform automatically becomes unlocked from the adjacent stepped platform.

Figure 8:
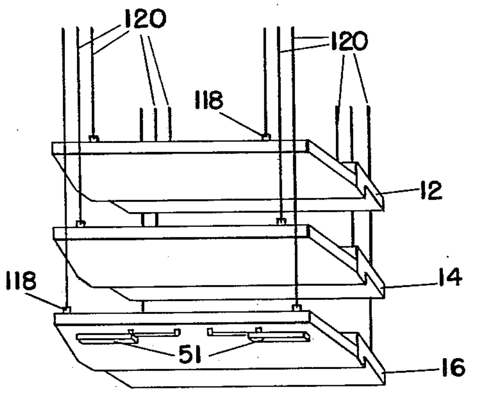
FIGURE 8 is a partial perspective view of the storing arrangement of the platforms of the present invention.

As each of the stepped platforms 12, 14, and 16 are disassembled, clip means 118 are secured on opposite sides of the platforms. The clip means 118 on one side of stepped platform 12 are spaced closer together than the clip means 118 on the same side of stepped platform 14. The clip means 118 on stepped platform 14 are spaced closer together than the clip means on stepped platform 16. Thus, the stepped platforms 12, 14, and 16 may be suspended from cables 120 with the stepped platforms positioned one above the other as shown more clearly in FIGURE 8. The spacing of the clip means 118 prevents the cables 120 from becoming tangled and interfering with one another. As shown in FIGURE 8, the stepped platforms are stored in a position suspended from the studio ceiling with the chair means 38 fixedly secured on the stepped platforms. For purposes of illustration, only the leg means on the stepped platform 16 is shown in FIGURE 8.

The movable live audience auditorium 10 of the present invention has been designed so that it may be installed or removed in a four hour period. The movable live audience auditorium 10 of the present invention enables floor space to have a dual function. When the movable live audience auditorium 10 of the present invention is assembled, it functions as a audience seating area. When the movable live audience auditorium 10 of the present invention has been disassembled and suspended from the studio ceiling, the floor space can be used for an entirely different studio purpose. Thus, floor space in a studio can be quickly and easily converted into a live audience auditorium. This results in a marked shortening of pre-air-time use of a studio floor space.

The grid-like ceiling 34 permits greater circulation of air, has an aesthetic appearance, is lightweight, and can be installed or removed with a minimum amount of effort. In addition, the grid-like ceiling has acoustical qualities which when combined with the loudspeakers 48 beneath the seat and back units 42 permits the propagation of sound without the production of echos.

Since television studios are only partly mechanized, and since most studios were built many years ago without proper planning for the most economic and efficient use of the studio, the crucial aspect of the present invention is the speed with which it may be assembled or disassembled. In addition to being capable of being installed or removed in a four hour period, the auditorium 10 of the present invention requires no trucking or external storage space and does not impair the studio floor in any manner. The movable live audience auditorium 10 of the present invention is designed so as to be color corrected and place the audience in the most receptive mood.

The wires for the loudspeakers 48 and for the lighting of the aisles on the stepped platforms have not been shown in the drawings. However, it will be appreciated that wires are provided which must be plugged and unplugged as the audience auditorium 10 is assembled and disassembled.

The present invention may be embodied in other specific forms without departing from the spirit or essential attributes thereof and, accordingly, reference should be made to the appended claims, rather than to the foregoing specification as indicating the scope of the invention.

I claim:

1. A movable live audience auditorium comprising first, second and third platforms, rows of chair means fixedly secured on said platforms, said chair means being spaced to form an aisle on said platforms, collapsible leg means on some of said platforms, the leg means on said third platform being longer than the leg means on said second platform, the leg means on said second platform being longer than the leg means on said first platform, and means along edges of said platforms selectively releasably interlocking said edges of said platforms so as to prevent relative movement between said platforms in a direction normal to the interlocking edges in a horizontal plane, the collapsible leg means including a horizontally disposed floor engaging member beneath one of said platforms, struts pivotably secured at opposite ends to said one platform and said floor engaging member, and selectively operable wheel means on said floor engaging member.

2. A movable live audience auditorium in accordance with claim 1 including fold-away walls abutting the periphery of said platforms, and a grid-like ceiling comprised of separate abutting panels supported by said walls.

3. A movable live audience auditorium in accordance with claim 1 wherein said wheel means includes a caster wheel pivotally secured to one end of a lever arm, an eccentric cam member pivotably secured to the other end of said lever arm, a flat portion on said cam member for engaging said floor engaging member when said wheel means is in its operative position, said lever arm being pivotably secured intermediate its ends to said floor engaging member, and means for rotating said cam member.

4. A movable live audience auditorium in accordance with claim 1 including clip means on said platforms, the clip means on one of said platforms being spaced apart differently from the spacing of the clip means on an adjacent platform, whereby each of said platforms may be suspended one above the other by separate cables secured to a different one of said clip means.

5. A movable live audience auditorium in accordance with claim 1 wherein said chair means includes horses extending across the major portion of the width of said platforms, seat and back units secured to said horses at spaced points, and arm rests secured to said horses between said seat and back units.

6. A movable live audience auditorium comprising first, second and third platforms, rows of chair means fixedly secured on said platforms, said chair means being spaced to form an aisle on said platforms, collapsible leg means on some of said platforms, the leg means on said third platform being longer than the leg means on said second platform, the leg means on said second platform being longer than the leg means on said first platform, means along edges of said platforms selectively releasably interlocking said edges of said platforms so as to prevent any relative movement between said platforms in a direction normal to the interlocking edges in a horizontal plane, foldaway walls abutting the periphery of said platforms, and a grid-like ceiling comprised of separate abutting panels supported by said walls.

7. The movable live audience auditorium of claim 6 wherein said chair means includes horses extending across the major portion of the width of said platforms, seat and back units secured to said horses at spaced points, arm rests secured to said horses between said seat and back units, and speaker units mounted immediately below each of said seat and back units, said grid-like ceiling being operative to prevent echoes within said movable live audience auditorium.

References Cited in the file of this patent

UNITED STATES PATENTS

| | | |
|---|---|---|
| 1,745,087 | Floto | Jan. 28, 1930 |
| 2,060,436 | Weltzel | Nov. 10, 1936 |
| 2,183,057 | Albach | Dec. 12, 1939 |
| 2,575,593 | Peery | Nov. 20, 1951 |
| 2,724,150 | Lubbin | Nov. 22, 1955 |
| 3,028,707 | Sagalovitch | Apr. 10, 1962 |

OTHER REFERENCES

Kuhnert, German application 1,026,517, printed March 20, 1958 (Kl. 37f 1–01).